(12) United States Patent
Seo et al.

(10) Patent No.: US 8,564,749 B2
(45) Date of Patent: Oct. 22, 2013

(54) LIQUID CRYSTAL DISPLAY DEVICE

(75) Inventors: Sung-Gon Seo, Yongin (KR); Jin-Hee Sung, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 134 days.

(21) Appl. No.: 13/053,858

(22) Filed: Mar. 22, 2011

(65) Prior Publication Data

US 2012/0062825 A1    Mar. 15, 2012

(30) Foreign Application Priority Data

Sep. 13, 2010    (KR) .................. 10-2010-0089459

(51) Int. Cl.
*G02F 1/1333*    (2006.01)
*G02F 1/1335*    (2006.01)

(52) U.S. Cl.
USPC .............................................. 349/122; 349/61

(58) Field of Classification Search
USPC ............................................ 349/61–69, 122
See application file for complete search history.

(56) References Cited

U.S. PATENT DOCUMENTS

| | | | |
|---|---|---|---|
| 6,878,435 B2 * | 4/2005 | Paik et al. | 428/215 |
| 2005/0243238 A1 * | 11/2005 | Cha et al. | 349/58 |
| 2011/0211133 A1 * | 9/2011 | Kamada | 349/64 |

FOREIGN PATENT DOCUMENTS

| | | |
|---|---|---|
| KR | 1998-068065 | 10/1998 |
| KR | 10-0601070 | 7/2006 |
| KR | 10-0637188 | 10/2006 |
| KR | 10-2008-0001785 | 1/2008 |
| KR | 10-2008-0085595 | 9/2008 |
| KR | 10-2009-0053042 | 5/2009 |

* cited by examiner

*Primary Examiner* — Dung Nguyen
(74) *Attorney, Agent, or Firm* — Robert E. Bushnell, Esq.

(57) ABSTRACT

A liquid crystal display (LCD) device capable of reducing damage due to drops and external impacts comprises a backlight unit (BLU), an LCD panel disposed opposite the BLU, and an adhesive member interposed between the BLU and the LCD panel. The adhesive member includes a first film bonded to the BLU, a second film bonded to the LCD panel, and a third film interposed between the first film and the second film. The third film includes a first portion bonded to the first film, a second portion bonded to the second film, and a third portion configured so as to connect the first portion and the second portion between the first and second portions.

15 Claims, 3 Drawing Sheets

LIQUID CRYSTAL DISPLAY DEVICE

CLAIM OF PRIORITY

This application makes reference to, incorporates the same herein, and claims all benefits accruing under 35 U.S.C. §119 from an application earlier filed in the Korean Intellectual Property Office on Sep. 13, 2010 and there duly assigned Serial No. 10-2010-0089459.

BACKGROUND OF THE INVENTION

1. Field of the Invention

The present invention relates to a liquid crystal display (LCD) device and, more particularly, to an LCD device having a high impact resistance.

2. Description of the Related Art

The liquid crystal display (LCD) device, which is excellent in terms of display properties, such as resolution, color reproduction and picture quality, has popularly been applied to monitors of notebooks or desktop computers.

In particular, since the LCD device is frequently used for mobile devices, the LCD device is very vulnerable to physical impacts and drops. Furthermore, when a crack occurs in a panel of the LCD device due to impact, the LCD device may experience a serious operational failure.

SUMMARY OF THE INVENTION

The present invention provides a liquid crystal display (LCD) device capable of reducing damage due to drops and external impacts.

According to an aspect of the present invention, an LCD device comprises: a backlight unit (BLU); an LCD panel disposed opposite the BLU; and an adhesive member interposed between the BLU and the LCD panel. The adhesive member includes a first film bonded to the BLU, a second film bonded to the LCD panel, and a third film interposed between the first film and the second film. The third film includes a first portion bonded to the first film, a second portion bonded to the second film, and a third portion configured so as to connect the first portion and the second portion at a point between the first and second portions.

The first film and the second film may be spaced apart from each other.

At least one of the first and second portions may be formed with a predetermined curvature.

The third film may be curved in a wave form between the first and second films.

The third portion may not be bonded to the first and second films.

The LCD device may further include a fourth film interposed between the first and second films.

At least the third portion of the third film may be located within the fourth film.

The fourth film may be less rigid than the third film.

The first film may include a first base and a first adhesive layer disposed on a surface of the first base disposed opposite the BLU.

The second film may include a second base and a second adhesive layer disposed on a surface of the second base disposed opposite the LCD panel.

According to another aspect of the present invention, an LCD device comprises: an LCD panel; a BLU disposed opposite the LCD panel; a support member disposed opposite the BLU on a side opposite to the LCD panel; and a tape at least partially interposed between the LCD panel and the BLU, and between the BLU and the support member. The tape has a higher impact absorbing capability in a first direction, parallel to a direction in which the LCD panel and the BLU are stacked, than in a second direction perpendicular to the first direction.

The tape may include: a first film bonded to the BLU; a second film spaced apart from the first film and bonded to the LCD panel; and a third film interposed between the first film and the second film, and alternately and repeatedly bonded to the first film and the second film.

A portion of the third film, which is bonded to at least one of the first and second films, may be formed with a predetermined curvature.

The LCD device may further include a fourth film interposed between the first film and the second film.

At least a portion of the third film may be located within the fourth film.

The fourth film may be less rigid than the third film.

The first film may include a first base and a first adhesive layer disposed on a surface of the first base disposed opposite the BLU.

The second film may include a second base and a second adhesive layer disposed on a surface of the second base disposed opposite the LCD panel.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
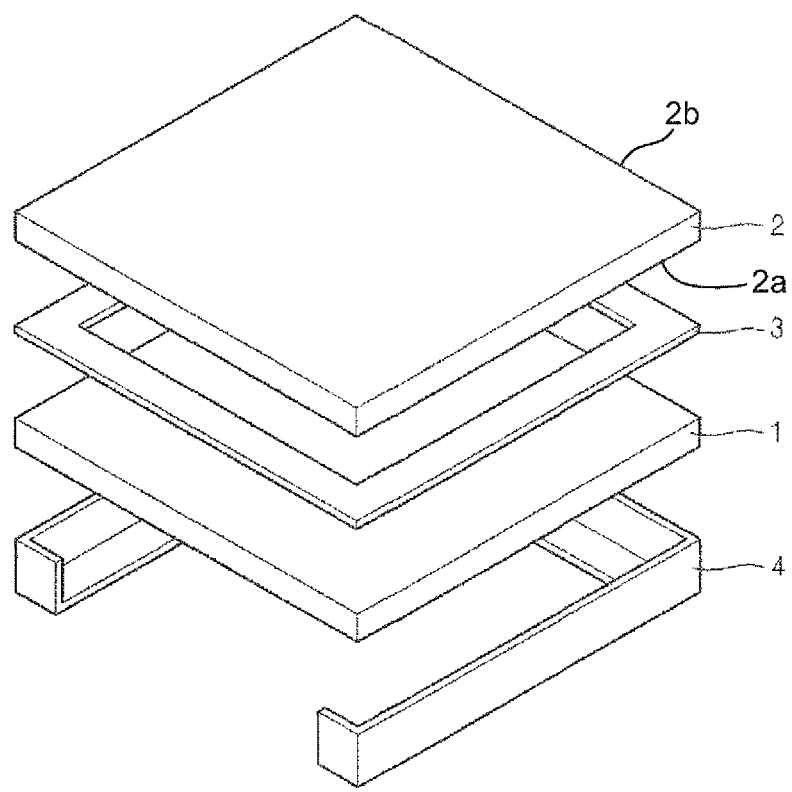
FIG. 1 is an exploded perspective view of a liquid crystal display (LCD) device according to an embodiment of the present invention.
Figure 2:
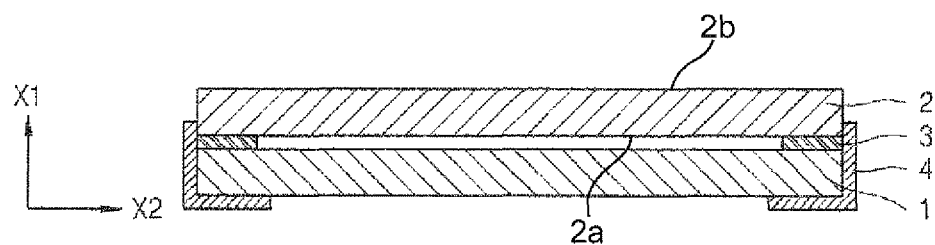
FIG. 2 is a cross-sectional view of the LCD device of FIG. 1.

FIG. 1 is an exploded perspective view of a liquid crystal display (LCD) device according to an embodiment of the present invention, and FIG. 2 is a cross-sectional view of the LCD device of FIG. 1.

Referring to FIG. 1, the LCD device according to the embodiment of the present invention includes a backlight unit (BLU) 1 serving as an effective light emission region, an LCD panel 2 disposed opposite the BLU 1, an adhesive member 3 interposed between the BLU 1 and the LCD panel 2, and a support member 4 configured so as to support and fix the assembly of the BLU 1 and the LCD panel 2.

Although not shown in FIG. 1, the BLU 1 may include a light source (e.g., a light-emitting diode (LED)), a light guide plate, and an optical sheet.

The LCD panel 2 may have a panel surface 2a disposed opposite the BLU 1. The LCD panel 2 may allow light incident from the BLU 1 to pass therethrough so as to create an image on a surface 2b of the LCD panel 2 disposed on a side opposite to the panel surface.

As shown in FIGS. 1 and 2, the BLU 1 and the LCD panel 2 may be bonded to each other with the adhesive member 3.

The adhesive member 3 may be provided so as to surround an edge of the LCD panel 2. Although the adhesive member 3 may have a closed-loop shape as shown in FIG. 1, the present invention is not limited thereto. For example, the adhesive member 3 may be partially adhered to at least one edge of the BLU 1 or the LCD panel 2.

The assembly of the BLU 1 and the LCD panel 2 may be supported and fixed by the support member 4.

In FIG. 2, the BLU 1 and the LCD panel 2 may be stacked along a first direction X1, and a second direction X2 may be a direction of a plane perpendicular to the first direction X1.

Figure 3:
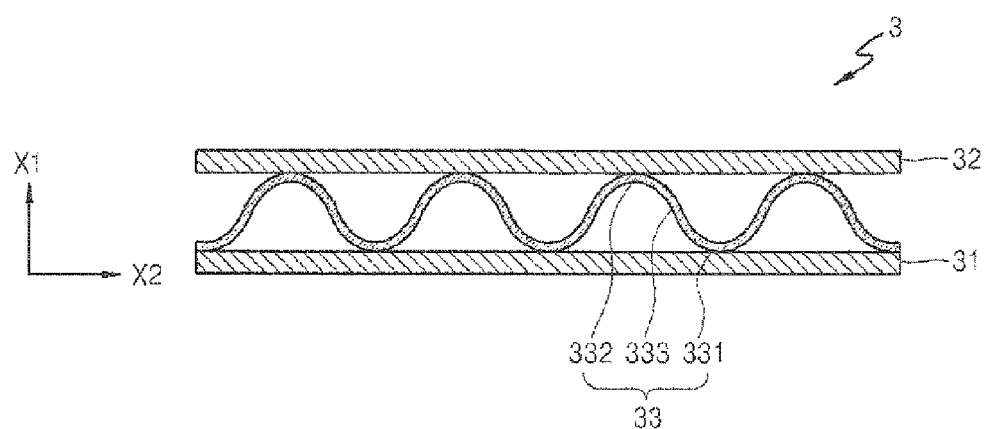
FIG. 3 is a cross-sectional view of an adhesive member of FIG. 1 according to an embodiment of the present invention.

FIG. 3 is a cross-sectional view of an adhesive member of FIG. 1 according to an embodiment of the present invention.

Referring to FIG. 3, the adhesive member 3 may include a first film 31 bonded to the BLU 1, a second film 32 bonded to the LCD panel 2, and a third film 33 interposed between the first film 31 and the second film 32.

As shown in FIG. 3, the adhesive member 3 may be configured such that the third film 33 is interposed between the first film 31 and the second film 32, which are spaced apart from and parallel to each other.

The third film 33 may include a first portion 331 bonded to the first film 31, a second portion 332 bonded to the second film 32, and a third portion 333 configured so as to connect the first portion 331 and the second portion 332.

At least one of the first and second portions 331 and 332, respectively, of the third film 33 may be formed with a predetermined curvature. For example, as shown in FIG. 3, the third film 33 may have a curved wave structure.

The third film 33 may have impact absorbing characteristics along the first direction X1 because the first portion 331 and the second portion 332 are bonded to the first film 31 and the second film 32, respectively, and the third portion 333 is not bonded to the first and second films 31 and 32. That is, the third film 33 may be alternately and repetitively bonded to the first film 31 and the second film 32.

Due to the above-described structure, the adhesive member 3 may have better impact absorbing characteristics when compressed in the first direction X1 than when compressed in the second direction X2.

Therefore, when the BLU 1 and the LCD panel 2 of FIGS. 1 and 2 are bonded to each other by the adhesive member 3, the impact absorbing characteristics of the adhesive member 3 may be further enhanced along the first direction X1.

The third film 33 of FIG. 3 may be formed of a highly elastic material. For example, a polyurethane material, such as PORON, or super clean foam (SCF) may be used. Each of the first film 31 and the second film 32 may be formed of a silicon-based adhesive layer. When each of the first and second films 31 and 32, respectively, is formed of silicon-based adhesive layer, the impact absorbing characteristics of the adhesive member 3 may be further enhanced along the first direction X1.

Figure 4:
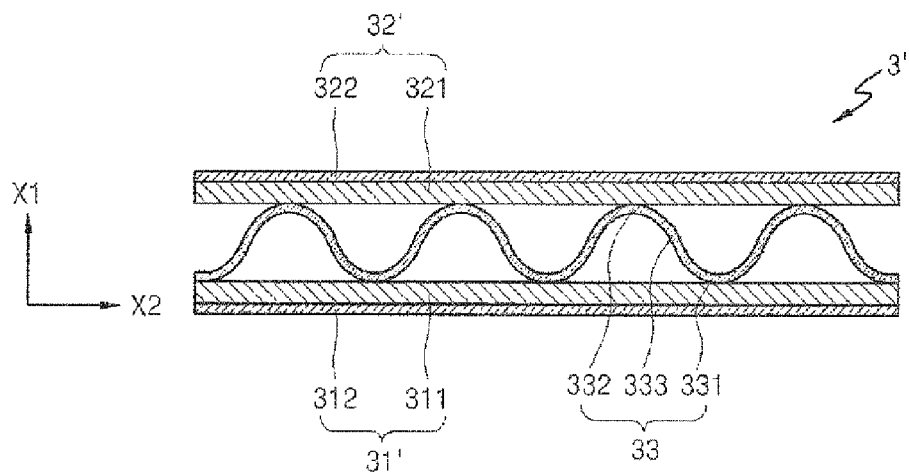
FIG. 4 is a cross-sectional view of the adhesive member of FIG. 1 according to another embodiment of the present invention.

FIG. 4 is a cross-sectional view of the adhesive member of FIG. 1 according to another embodiment of the present invention.

As shown in FIG. 4, the adhesive member 3' may include a first film 31' and a second film 32'. The first film 31' may include a first base 311 and a first adhesive layer 312 located on an outer surface of the first base 311 disposed opposite the BLU 1. The second film 32' may include a second base 321 and a second adhesive layer 322 located on an outer surface of the second base 321 disposed opposite the LCD panel 2.

Each of the first and second bases 311 and 321, respectively, may include a film material, such as polyester (PE) or polyethyleneterephthalate (PET). Each of the first and second adhesive layers 312 and 322, respectively, which are disposed on the first and second bases 311 and 321, respectively, may include a silicon-based adhesive layer. Since each of the first and second adhesive layers 312 and 322, respectively, includes the silicon-based adhesive layer, the impact absorbing characteristics of the adhesive member 3' may be further enhanced along the first direction X1.

Since the third film 33 is the same as in the embodiment described with reference to FIG. 3, a detailed description thereof will be omitted.

Figure 5:
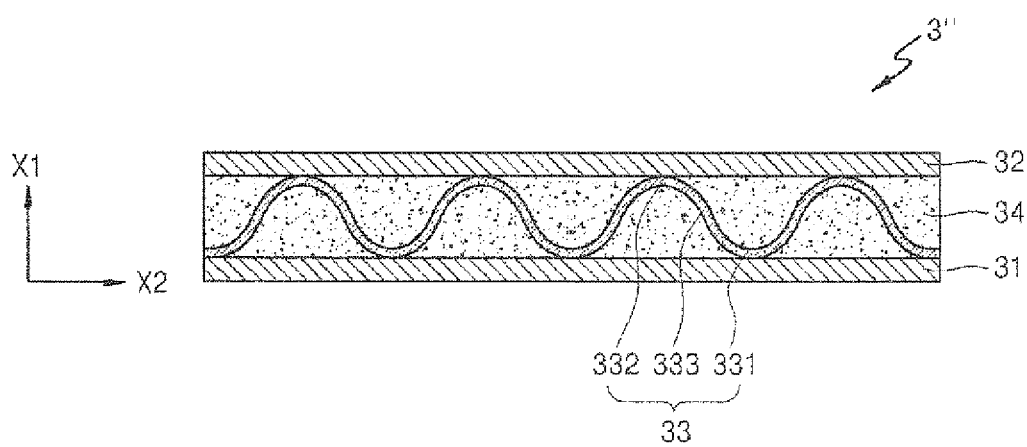
FIG. 5 is a cross-sectional view of the adhesive member of FIG. 1 according to another embodiment of the present invention.

FIG. 5 is a cross-sectional view of the adhesive member of FIG. 1 according to another embodiment of the present invention.

As shown in FIG. 5, the adhesive member 3" may further include a fourth film 34 interposed between the first film 31 and the second film 32, unlike in the embodiment shown in FIG. 3.

Since the fourth film 34 is interposed between the first and second films 31 and 32, respectively, and bonded to the first and second films 31 and 32, respectively, at least a portion of a third film 33 (for example, a third portion 333) may be located within the fourth film 34.

The fourth film 34 may be formed of a material which may be less rigid than the third film 33 formed of PET so as not to affect the impact absorbing characteristics of the third film 33 along a first direction X1. The fourth film 34 may be formed of a silicon-based material so as to further improve the impact absorbing characteristics of the adhesive member 3".

In the embodiment of FIG. 5, the first film 31 and the second film 32 may be formed in the same manner as the first film 31' and the second film 32' in the embodiment of FIG. 4.

Figure 6:
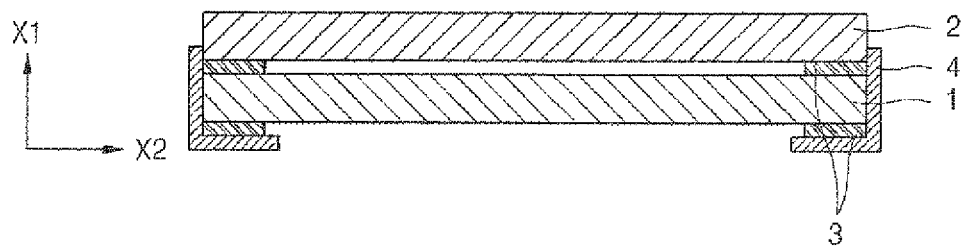
FIG. 6 is a cross-sectional view of an LCD device according to another embodiment of the present invention.

FIG. 6 is a cross-sectional view of an LCD device according to another embodiment of the present invention.

Referring to FIG. 6, the adhesive member 3 may be interposed not only between an LCD panel 2 and the BLU 1, but also between the BLU 1 and the support member 4.

In this case, since impact absorbing characteristics between the BLU 1 and the support member 4 may also be improved, the impact resistance of the LCD device according to this embodiment of the present invention can be further improved.

According to the present invention as described above, an LCD device having a high impact resistance can be provided.

In particular, the impact absorbing capability of the LCD device can be further improved along a direction in which the LCD panel and the BLU are stacked, thereby preventing glass constituting the LCD device from being damaged or broken.

While the present invention has been particularly shown and described with reference to exemplary embodiments thereof, it will be understood by those skilled in the art that various changes in form and detail may be made therein without departing from the spirit and scope of the invention as defined by the appended claims. The exemplary embodiments should be considered in a descriptive sense only, and not for purposes of limitation. Therefore, the scope of the invention is defined not by the detailed description of the invention but by the appended claims, and all differences within the scope will be construed as being included in the present invention.

What is claimed is:
1. A liquid crystal display (LCD) device, comprising:
a backlight unit (BLU);

an LCD panel disposed opposite the BLU; and
an adhesive member interposed between the BLU and the LCD panel;
wherein the adhesive member includes a first film bonded to the BLU, a second film bonded to the LCD panel, and a third film interposed between the first film and the second film; and
wherein the third film includes a first portion bonded to the first film, a second portion bonded to the second film, and a third portion configured to connect the first portion and the second portion between the first and second portions, wherein at least one of the first and second portions is formed with a predetermined curvature.

2. A liquid crystal display (LCD) device, comprising:
a backlight unit (BLU);
an LCD panel disposed opposite the BLU; and
an adhesive member interposed between the BLU and the LCD panel;
wherein the adhesive member includes a first film bonded to the BLU, a second film bonded to the LCD panel, and a third film interposed between the first film and the second film; and
wherein the third film includes a first portion bonded to the first film, a second portion bonded to the second film, and a third portion configured to connect the first portion and the second portion between the first and second portions, wherein the third film is curved in a wave form between the first and second films.

3. A liquid crystal display (LCD) device, comprising:
a backlight unit (BLU);
an LCD panel disposed opposite the BLU; and
an adhesive member interposed between the BLU and the LCD panel;
wherein the adhesive member includes a first film bonded to the BLU, a second film bonded to the LCD panel, and a third film interposed between the first film and the second film; and
wherein the third film includes a first portion bonded to the first film, a second portion bonded to the second film, a third portion configured to connect the first portion and the second portion between the first and second portions, and a fourth film interposed between the first and second films.

4. The device of claim 3, wherein at least the third portion of the third film is located within the fourth film.

5. The device of claim 3, wherein the fourth film is less rigid than the third film.

6. A liquid crystal display (LCD) device, comprising:
an LCD panel;
a backlight unit (BLU) disposed opposite the LCD panel;
a support member disposed opposite the BLU on a side opposite to the LCD panel; and
an adhesive member at least partially interposed between the LCD panel and the BLU, and between the BLU and the support member;
wherein the adhesive member has a higher impact absorbing capability in a first direction, parallel to a direction in which the LCD panel and the BLU are stacked, than in a second direction perpendicular to the first direction.

7. The device of claim 6, wherein the adhesive member comprises:
a first film bonded to the BLU;
a second film spaced apart from the first film and bonded to the LCD panel; and
a third film interposed between the first film and the second film, and alternately and repeatedly bonded to the first film and the second film.

8. The device of claim 7, wherein a portion of the third film is formed with a predetermined curvature.

9. The device of claim 7, further comprising a fourth film interposed between the first film and the second film.

10. The device of claim 9, wherein at least a portion of the third film is located within the fourth film.

11. The device of claim 9, wherein the fourth film is less rigid than the third film.

12. The device of claim 7, wherein the first film comprises a first base and a first adhesive layer located on a surface of the first base disposed opposite the BLU.

13. The device of claim 7, wherein the second film comprises a second base and a second adhesive layer located on a surface of the second base disposed opposite the LCD panel.

14. A liquid crystal display (LCD) device having a backlight unit (BLU) bonded to an LCD panel by an adhesive member, the adhesive member including:
a first adhesive film;
a second adhesive film parallel to the first adhesive film; and
an impact absorbing film interposed between the first adhesive film and the second adhesive film, the impact absorbing film disposed not to be parallel to either of the first and second adhesive films, the impact absorbing film being bonded to the first adhesive film at a plurality of first portions of the impact absorbing film, the impact absorbing film being bonded to the second adhesive film at a plurality of second portions of the impact absorbing film, and the impact absorbing film having a plurality of third portions disposed between corresponding ones of the first and second portions, such that the third portions do not contact either of the first and second films.

15. The adhesive member as set forth in claim 14, the third film being curved in a predetermined wave form.

* * * * *